United States Patent
Kim et al.

(10) Patent No.: US 12,458,682 B2
(45) Date of Patent: *Nov. 4, 2025

(54) METHOD FOR TREATMENT OF AUTISM SPECTRUM DISORDER, MOUSE FOR MONITORING AUTISM SPECTRUM DISORDER, AND METHOD FOR SCREENING CANDIDATE MATERIAL FOR PREVENTION OR TREATMENT OF AUTISM SPECTRUM DISORDER

(71) Applicant: KOREA INSTITUTE OF SCIENCE AND TECHNOLOGY, Seoul (KR)

(72) Inventors: Jeongjin Kim, Seoul (KR); Hea-Jin Kim, Seoul (KR); Yuliia Steshenko, Seoul (KR); Sejin Jeon, Seoul (KR); Hyunsoo Park, Seoul (KR); Wooyeon Shin, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 359 days.

This patent is subject to a terminal disclaimer.

(21) Appl. No.: 17/293,469

(22) PCT Filed: Nov. 13, 2019

(86) PCT No.: PCT/KR2019/015454
§ 371 (c)(1),
(2) Date: May 12, 2021

(87) PCT Pub. No.: WO2020/101352
PCT Pub. Date: May 22, 2020

(65) Prior Publication Data
US 2022/0047670 A1    Feb. 17, 2022

(30) Foreign Application Priority Data
Nov. 13, 2018    (KR) .................. 10-2018-0138603

(51) Int. Cl.
| | |
|---|---|
| *A61K 38/16* | (2006.01) |
| *A01K 67/0278* | (2024.01) |
| *A61K 41/00* | (2020.01) |
| *A61K 48/00* | (2006.01) |
| *A61P 25/00* | (2006.01) |

(52) U.S. Cl.
CPC ........ *A61K 38/164* (2013.01); *A01K 67/0278* (2013.01); *A61K 41/00* (2013.01); *A61P 25/00* (2018.01); *A01K 2227/105* (2013.01); *A01K 2267/03* (2013.01); *A61K 48/00* (2013.01)

(58) Field of Classification Search
CPC ...... A61K 38/164; A61K 41/00; A61K 48/00; A61K 31/7088; A61K 38/16; A61K 48/005; A61K 48/0075; A61K 49/0008; A01K 67/0278; A01K 2227/105; A01K 2267/03; A01K 67/027; A61P 25/00; A61P 25/18; A61N 5/062; A61N 5/0622; C12N 2750/14143; A61B 5/00; A61B 5/4848

See application file for complete search history.

(56) References Cited

U.S. PATENT DOCUMENTS

| | | | |
|---|---|---|---|
| 10,849,990 B2 * | 12/2020 | Kim | ..................... C12N 5/0619 |
| 2011/0311489 A1 * | 12/2011 | Deisseroth | ............. A61N 5/062 |
| | | | 536/23.6 |
| 2012/0121542 A1 | 5/2012 | Chuong et al. | |
| 2015/0040249 A1 | 2/2015 | Deisseroth et al. | |
| 2021/0038743 A1 * | 2/2021 | Kim | ..................... A61N 5/0622 |

FOREIGN PATENT DOCUMENTS

| | | |
|---|---|---|
| JP | 2018500001 A | 1/2018 |
| KR | 1020130020669 A | 2/2013 |

OTHER PUBLICATIONS

Owen et al. "Fast-spiking interneurons supply feedforward control of bursting, calcium, and plasticity for efficient learning." Cell 172.4 (2018): 683-695 (Year: 2018).*
Galvan et al. "In vivo optogenetic control of striatal and thalamic neurons in non-human primates." PLoS One 7.11 (2012): e50808 (Year: 2012).*
Rogers et al. "Reorganization of circuits underlying cerebellar modulation of prefrontal cortical dopamine in mouse models of autism spectrum disorder." The Cerebellum 12 (2013): 547-556 (Year: 2013).*

(Continued)

*Primary Examiner* — Fereydoun G Sajjadi
*Assistant Examiner* — Alexander W Nicol
(74) *Attorney, Agent, or Firm* — Rabin & Berdo, P.C.

(57) ABSTRACT

The present invention relates to a method for treating autism spectrum disorder, a mouse for monitoring autism spectrum disorder, and a method for screening a candidate for preventing or treating autism spectrum disorder. Specifically, according to the present invention, the output signal (or excitation of population) of neurons of the ventrolateral thalamus (VL), the laterodorsal thalamus (LD) or the striatum may be suppressed by introducing a halorhodopsin protein into neurons of the ventrolateral thalamus (VL), the laterodorsal thalamus (LD) or the striatum and then irradiating light to induce hyperpolarization of the halorhodopsin protein. Thus, the present invention has the effect of preventing or treating autism.

5 Claims, 3 Drawing Sheets
Specification includes a Sequence Listing.

(56) References Cited

OTHER PUBLICATIONS

Caleb D. Doll et al., "Impaired activity-dependent neural circuit assembly and refinement in autism spectrum disorder genetic models", Frontiers in Cellular Neuroscience, Feb. 7, 2014, vol. 8, (30), pp. 1-26.
Genbank P15647.1, RecName: Full=Halorhodopsin [Natronomonas pharaonis] (Oct. 10, 2018).
Owen, S.F. et al., Fast-Spiking Interneurons Supply Feedforward Control of Bursting, Calcium, and Plasticity for Efficient Learning, Cell. Feb. 8, 2018, vol. 172, pp. 683-695, e1-e8.

* cited by examiner

METHOD FOR TREATMENT OF AUTISM SPECTRUM DISORDER, MOUSE FOR MONITORING AUTISM SPECTRUM DISORDER, AND METHOD FOR SCREENING CANDIDATE MATERIAL FOR PREVENTION OR TREATMENT OF AUTISM SPECTRUM DISORDER

TECHNICAL FIELD

The present invention relates to a method for autism spectrum disorder, a mouse for monitoring autism spectrum disorder, and a method for screening a candidate for preventing or treating autism spectrum disorder, and particularly to a method of treating autism by suppressing the output signal of a population of neurons in the ventrolateral thalamus (VL), the laterodorsal thalamus (LD) or the striatum.

BACKGROUND ART

Autism spectrum disorder (ASD), also called autism, is a pervasive developmental disorder (PDD) which is a group of neurodevelopmental conditions with social communication and interaction deficits and repetitive stereotyped behaviors.

Autism appears in various forms, the severity thereof varies from individual to individual, and examples thereof include autistic disorder, Rett's disorder, childhood disintegrative disorder, Asperger's syndrome, obsession disorder, obsessive compulsive disorder, and Pervasive Developmental Disorder Not Otherwise Specified (PDD-NOS). The PDD-NOS refers to a disorder that is close to autism, but does not meet the diagnostic criteria of the American Psychiatric Association, which are the criteria of diagnostic and statistical manual of Mental Disorder IV (DSM-IV). In addition, the PDD-NOS refers to a case where all the three main symptoms of autism do not appear but some of them appear. The PDD-NOS is defined as atypical autism disorder in the International Classification of Disease (ICD) published by the WHO.

The most common form of autism is childhood autism which shows a prevalence of 2 to 5 per 10,000 people, and shows a prevalence of 20 to 50 per 10,000 people when including pervasive developmental disorders such as Asperger's syndrome. The gender ratio of childhood autism is about 4:1, indicating that the incidence thereof is higher in males than females.

The etiology of autism been definitively established, and the majority of studies have been focused on reporting related gene groups through genomic testing. However, studies at the level of neural circuits, which can directly lead to a therapeutic method, remain insufficient.

Imaging studies of some patients show that the basal ganglia of the brain, the cerebral cortex and the structures connected thereto are related brain regions, but the functions thereof remain unclear. Some studies have reported that regulation of glutamate, GABA, dopamine, serotonin and oxytocin neurotransmitters produced in these brain regions is related to autism. However, studies on the regulation of neural circuits and behaviors by these neurotransmitters remain insufficient.

For autism, there is no clear therapeutic agent, and symptomatic therapy is mainly used. Among them, the most commonly used drugs include Risperidone. The most commonly used drugs for autism include risperidone. However, patient responsiveness to this drug is diverse and the drug has increasing side effects, and hence the development of a therapeutic agent is urgent. Although there are increasing attempts to use deep brain stimulation (DBS) to treat severe repetitive behaviors and social deficits, these attempts have a problem in that it is difficult to define targeted brain circuits.

Accordingly, in order to develop an effective therapeutic agent for autism, there is a need for a study at the level of neural circuits and a study on targeted brain circuits, which can be directly lead to a therapeutic method, but studies thereon are difficult to find.

Meanwhile, optogenetics is a biological technology that combines optics and genetics and is capable of controlling cells in living tissues by light. A typical case is that neurons are genetically engineered to express ion channels that respond to light.

When optogenetics is used, it is possible to regulate and observe the activity of individual neurons in living tissues, even in freely moving animals, and monitor in real-time any effect induced by the regulation of neuronal activity. For the regulation of neuronal activity, light-responsive proteins such as channelrhodopsin, halorhodopsin or archaerhodopsin are used, and for photo-visual recording of neuronal activity, optogenetic sensors are used, such as GCaMP for detecting calcium concentration changes, synaptopHluorin for detecting neuronal endoplasmic reticulum secretion, GluSnFRs for detecting neurotransmitters, and Arclightning (ASAP1) for detecting cell membrane potential.

As it becomes possible to regulate neuronal activity using optogenetics, optogenetics has been applied to understanding the mechanisms of neurological diseases or developing therapeutic methods for neurological diseases.

Therefore, the present inventors define a brain region capable of controlling the behavioral symptoms of autism, and propose that the defined brain region may be used for diagnosis and treatment of autism.

DISCLOSURE

Technical Problem

The present invention has been made in order to solve the above-described problems, and is intended to provide a method of treating autism spectrum disorder by suppressing the output signal of a population of specific neurons in the brain, a mouse for monitoring autism spectrum disorder, and a method for screening a candidate for preventing or treating autism spectrum disorder.

Technical Solution

One embodiment of the present invention is a method for treating autism spectrum disorder, the method comprising a step of suppressing the output signal of neurons of the ventrolateral thalamus (VL), the laterodorsal thalamus (LD) or the striatum.

Another embodiment of the present invention is a mouse for monitoring autism spectrum disorder, in which halorhodopsin, a polynucleotide encoding the halorhodopsin, or a vector comprising the polynucleotide has been introduced and expressed in neurons of the ventrolateral thalamus (VL), laterodorsal thalamus (LD) or striatum of the mouse.

Still another embodiment of the present invention is a method for screening a candidate for preventing or treating autism spectrum disorder, the method comprising steps of: injecting the candidate for preventing or treating autism spectrum disorder into the mouse for monitoring autism spectrum disorder; irradiating light in a red wavelength region to the mouse injected with the candidate; and comparing the behavior of the light-irradiated mouse with that of a control group.

Advantageous Effects

According to the present invention, it is possible to provide a method of treating autism by suppressing the output signal of a population of neurons in the ventrolateral thalamus (VL), the laterodorsal thalamus (LD) or the striatum, which is a specific region of the brain.

Specifically, according to the present invention, the output signal (or excitation of population) of neurons of the ventrolateral thalamus (VL), laterodorsal thalamus (LD) or striatum of a subject with autism may be suppressed by introducing a halorhodopsin protein into the neurons of the ventrolateral thalamus (VL), the laterodorsal thalamus (LD) or the striatum and then irradiating light to induce hyperpolarization of the halorhodopsin protein. Thus, the present invention has the effect of preventing or treating autism.

MODE FOR INVENTION

The present invention may be subjected to various modifications, and may have various embodiments. Specific embodiments are illustrated in drawings, and will be described in the detailed description of the present invention. However, this is not intended to limit the present invention to specific embodiments. It should be understood that the present invention includes all modifications, equivalents or replacements that fall within the spirit and technical scope of the present invention. In the following description, the detailed description of related publicly-known technology will be omitted when it may obscure the subject matter of the present invention.

Terms used herein are only to describe specific embodiments and are not intended to limit the scope of the present invention. Singular expressions include plural expressions unless otherwise specified in the context thereof. In the present specification, it should be understood that terms such as "comprise" and "have" are intended to denote the existence of mentioned characteristics, numbers, steps, operations, components, parts, or combinations thereof, but do not exclude the probability of existence or addition of one or more other characteristics, numbers, steps, operations, components, parts, or combinations thereof.

Although terms such as "first" and "second" may be used to describe various components, the components should not be limited by these terms. These terms are used only to distinguish one component from another component.

Throughout the present specification, when any step is referred to as being "on" or "before" with another step, it refers to not only a case where any step is in direct time series relationship with another step, but also a case where the two steps are in an direct time series relationship in which the time series order in the two steps may be reversed, like a mixing step after each step.

Through the specification, words of degree, such as "about", "substantially", and the like are used herein in the sense of "at, or nearly at, when given the manufacturing and material tolerances inherent in the stated circumstances" and are used to prevent the unscrupulous infringer from unfairly taking advantage of the invention disclosure where exact or absolute figures are stated as an aid to understanding the invention. Throughout the present invention, the term "step of . . . " does not mean "step for . . . ."

Hereinafter, the present invention will be described in detail.

The present invention provides a method for treating autism spectrum disorder, the method comprising a step of suppressing the output signal of neurons of the ventrolateral thalamus (VL), the laterodorsal thalamus (LD) or the striatum.

The output signal of neurons of the ventrolateral thalamus (VL), the laterodorsal thalamus (LD) or the striatum may be the output signal of individual neurons or a population of neurons in the ventrolateral thalamus (VL), the laterodorsal thalamus (LD) or the striatum, and may also be a signal that is associated with the excitation of a population of neurons or cause the excitation of the population. In addition, the output signal is meant to include the population neuronal activity of the ventrolateral thalamus (VL), laterodorsal thalamus (LD) or striatum region. That is, the present invention may comprise a step of suppressing the population activity of dozens or hundreds of neurons existing in the ventrolateral thalamus (VL), laterodorsal thalamus (LD) or striatum region.

The output signal that is generated from neurons of the ventrolateral thalamus (VL) or the laterodorsal thalamus (LD) may be induced by an input transmitted to the striatum, and the output signal may be suppressed by suppressing neurons of the ventrolateral thalamus (VL), the laterodorsal thalamus (LD) and/or the striatum by light. For example, the present inventors have assumed that, when the striatum is irradiated with light, the signal moving from the ventrolateral thalamus (VL) and/or the laterodorsal thalamus (LD) to the striatum will be blocked (when using halorhodopsin), enhanced or activated (when using channelrhodopsin), and have confirmed that autism behaviors can be alleviated by controlling transmission of the above-described signal.

The ventrolateral thalamus (VL) and the laterodorsal thalamus (LD) are included in the ventral anterolateral thalamus (VAL), and the present inventors have conducted experiments on the ventrolateral thalamus (VL), which is a ventral region, and the laterodorsal thalamus (LD) which is a dorsal region, and have found that, when the output signals of neurons of the ventrolateral thalamus (VL) and the laterodorsal thalamus (LD), which are specific regions of the brain, is suppressed, autism may be treated, thereby completing the present invention. In the present specification, the ventral anterolateral thalamus (VAL) is used in the same or similar meaning to the anteroventral thalamus (AV) and the anteroventral thalamic (AVTh).

In the present invention, it is possible to use various methods capable of suppressing the output signal of neurons of the ventrolateral thalamus (VL), the laterodorsal thalamus (LD) or the striatum. For example, in the present invention, the output signal may be suppressed by injecting a drug capable of inhibiting the output signal of neurons of the ventrolateral thalamus (VL), the laterodorsal thalamus (LD) or the striatum, or providing electrical stimulation to the ventrolateral thalamus (VL), the laterodorsal thalamus (LD) or the striatum.

In addition, the output signal may be suppressed by: injecting a substance that inhibits neuronal activity; or controlling the molecular mechanisms associated with the ventrolateral thalamus (VL), the laterodorsal thalamus (LD) or the striatum; or inducing hyperpolarization of neurons of the ventrolateral thalamus (VL), the laterodorsal thalamus (LD) or the striatum; or treating neurons of the ventrolateral thalamus (VL), the laterodorsal thalamus (LD) or the striatum with a $Ca^{2+}$ channel blocker; or using a DREADD (designer receptors exclusively activated by designer drugs) method. The substance that inhibits neuronal activity may be, but is not limited to, Jaws, Arch, ArchT, NpHR, iCc++ SwiChR++, or the like. Since the output signals of neurons of the ventrolateral thalamus (VL), the laterodorsal thalamus (LD) or the striatum is mediated by $Ca^{2+}$ channel activation, the output signal may be suppressed by inhibiting the $Ca^{2+}$ channel. In addition, it is possible to introduce a protein, which controls the molecular mechanisms or induces hyperpolarization, into neurons of a subject with autism spectrum disorder.

Particularly, in the present invention, a halorhodopsin protein, a polynucleotide encoding the halorhodopsin protein, or a vector comprising the polynucleotide may be introduced into neurons of the ventrolateral thalamus (VL), laterodorsal thalamus (LD) or striatum of a subject with autism spectrum disorder in order to suppress the output signal of neurons of the ventrolateral thalamus (VL), the laterodorsal thalamus (LD) or the striatum.

The halorhodopsin protein refers to an ion pump that induces hyperpolarization by introducing chloride ions into cells in response to light, and the halorhodopsin protein may be composed of an amino acid sequence set forth in SEQ ID NO: 1.

The halorhodopsin protein is preferably a protein that introduces chloride ions ($Cl^-$) into cells in response to light and induces hyperpolarization, thereby suppressing the output signal of a population of neurons in the ventrolateral thalamus (VL), the laterodorsal thalamus (LD) or the striatum. Any protein may be used without limitation as long as it is a protein capable of suppressing the output signal of a population of neurons in the ventrolateral thalamus (VL), the laterodorsal thalamus (LD) or the striatum in response to light. Specifically, the protein may be, but is not limited to, iC++ or ArchT.

Examples of the halorhodopsin protein include a wild-type protein having the activity of a chlorine ion pump, as well as a functional homologue having an amino acid sequence homology of at least 90% and having the activity of a chloride ion pump.

As used herein, the term "homology" is intended to refer to the extent of similarity to the amino acid sequence of the wild-type protein, and the halorhodopsin protein of the present invention comprises an amino acid sequence which is at least 70%, preferably at least 90%, more preferably at least 95% identical to the wild-type amino acid sequence defined as the sequence of SEQ ID NO: 1. The comparison of homology may be performed visually or by using an easily available comparison program. Using a commercially available computer program, the homology between two or more sequences may be expressed as a percentage (%), and the homology (%) between adjacent sequences may be calculated.

The halorhodopsin protein may include an amino acid sequence variant thereof as long as it retains the activity of a chloride ion pump. As used herein, the term "variant" refers to a protein having a different sequence due to deletion, insertion, and non-conservative or conservative substitution, or a combination thereof of one or more amino acid residues in the wild-type amino acid sequence.

This variant includes either a functional homologue having substantially the same activity to the wild-type protein or a protein having a modification that enhances reduces physicochemical properties. Preferably, it is a variant having a modification of the physicochemical properties of the protein. For example, it is a variant having enhanced structural stability against external environments including physical factors, such as temperature, humidity, pH, electrolytes, reducing sugars, pressure, dryness, freezing, interfacial tension, light, repeated freezing and thawing, high concentrations, and the like; and chemical factors, such as acids, alkalis, neutral salts, organic solvents, metal ions, oxidizing and reducing agents, proteases, and the like. In addition, it may be a variant having enhanced activity having enhanced activity due to a mutation in the amino acid sequence.

The halorhodopsin protein may be prepared by direct isolation from an organism, or chemically synthesized, or obtained using genetic recombination technology. When the halorhodopsin protein is prepared by direct isolation from an organism, isolation and purification of the halorhodopsin protein contained in cells may be performed by a number of known methods. When the halorhodopsin protein is chemically synthesized, it may be obtained using a polypeptide synthesis method widely known in the art. The polypeptide may be produced using conventional stepwise liquid or solid phase synthesis, fragment condensation, F-MOC or T-BOC chemistry. When the genetic recombination technology is used, the halorhodopsin protein may be obtained by inserting the polynucleotide (nucleic acid) encoding the halorhodopsin protein into a proper expression vector, transforming the vector into a host cell, culturing the host cell so as to express the halorhodopsin protein, and then recovering the protein from the host cell. After the protein is expressed in a selected host cell, isolation and purification thereof may be performed using general biochemical separation techniques, for example, treatment with a protein precipitating agent (salting out), centrifugation, ultrasonic disruption, ultrafiltration, dialysis, and various chromatography techniques such as molecular sieve chromatography (gel filtration), adsorptive chromatography, ion-exchange chromatography, or affinity chromatography. Generally, in order to isolate the protein with high purity, these techniques are in combination.

The polynucleotide encoding the halorhodopsin protein may be composed of the nucleotide sequence of SEQ ID NO: 2, but may also be a polynucleotide having at least one nucleotide substitution, deletion or insertion as long it may encode the halorhodopsin protein. The polynucleotide having at least one nucleotide substitution, deletion or insertion may have a homology of at least 70%, preferably at least 80%, more preferably at least 90% to the polynucleotide of SEQ ID NO: 2.

The vector comprising the polynucleotide may have an origin of replication, a promoter, a marker gene, and a translation control element. The vector may be a gene construct which is capable of expressing a target protein in an appropriate host cell and comprises essential regulatory elements operably linked to express the gene insert.

The vector containing the polynucleotide may be any one selected from the group consisting of a linear DNA vector, a plasmid DNA vector, and a recombinant viral vector. In addition, the recombinant viral vector may be any one selected from the group consisting of retrovirus, adenovirus, adeno-associated virus, and lentivirus. According to one embodiment of the present invention, the vector comprising the polynucleotide is preferably an adeno-associated virus, but is not limited thereto.

The vector comprising the polynucleotide may be introduced into neurons of the ventrolateral thalamus (VL), laterodorsal thalamus (LD) or striatum of the subject by any one method selected from the group consisting of transfection, electrophoresis, transduction, microinjection and ballistic introduction. According to one embodiment of the present invention, transfection is most preferably used, but is not limited thereto.

According to one embodiment of the present invention, the method may further comprise a step of irradiating light in a red wavelength region to the subject having introduced therein the halorhodopsin protein, the polynucleotide encoding the halorhodopsin protein, or the vector comprising the polynucleotide.

The light in the red wavelength region may have a wavelength of 580 to 670 nm, preferably 600 to 650 nm. According to one embodiment of the present invention, the light in the red wavelength region may have a wavelength of 630 nm.

The step of irradiating light may comprise irradiating light to neurons of the ventrolateral thalamus (VL), laterodorsal thalamus (LD) or striatum of the subject. The light may be irradiated to neurons of all the ventrolateral thalamus (VL), the laterodorsal thalamus (LD) and the striatum at once or at the same time, or may also be irradiated to neurons of one selected from among the ventrolateral thalamus (VL), the laterodorsal thalamus (LD) and the striatum. A controlled amount of the light may be selectively irradiated. In particular, the present inventors selectively irradiated light only to the striatum in the Experimental Example described below, and in this case, there is an advantage in that the relevance of other brain regions connected to the VAL may be excluded by irradiating light only to the striatum region from which the axons of the neurons expressing the optogenetic protein of VAL (or AV) extend.

Figure 1:
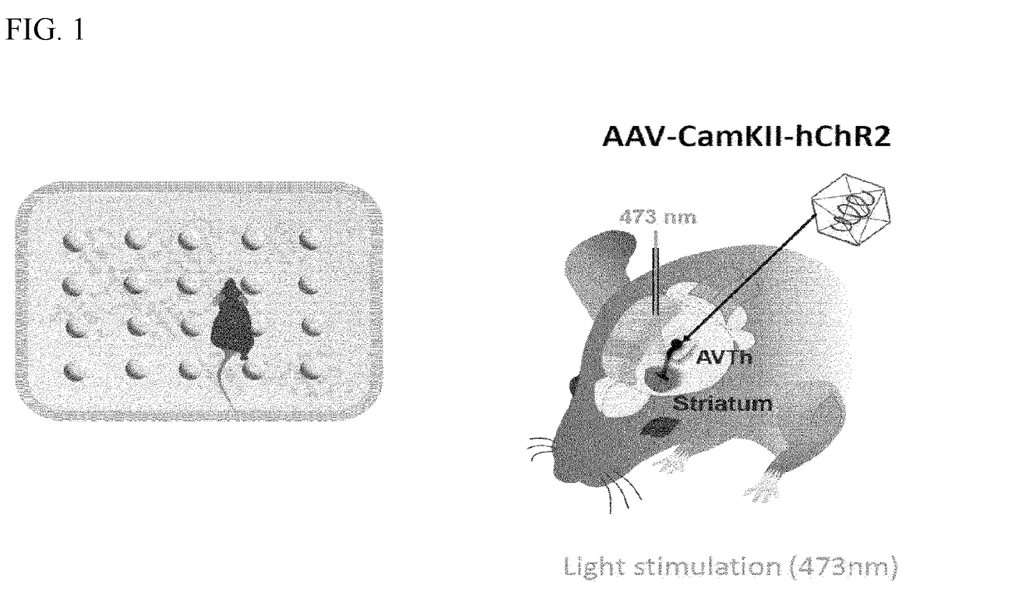
FIG. 1 is a schematic view explaining an experimental example for photostimulation of the ventrolateral thalamus (VL)-striatum synapses in a normal mouse according to one example of the present invention. The left side of FIG. 1 shows a repetitive behavior verification experiment for verification of autism symptoms, and the right side of FIG. 1 shows the results of expressing channelrhodopsin 2 (hChR2) in the VAL (or AV) region and then irradiating blue light at 473 nm to the striatum region.
Figure 2:
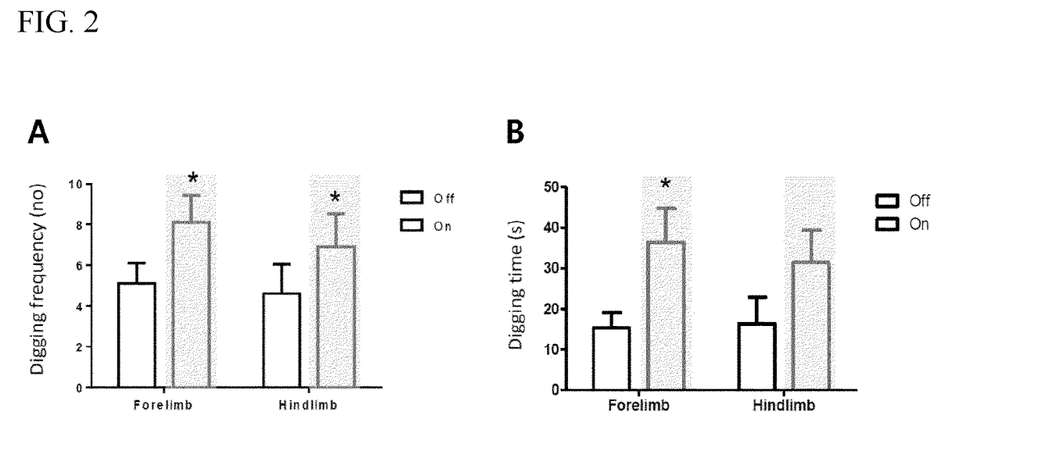
FIG. 2 depicts graphs showing that, when light was transmitted to the ventrolateral thalamus (VL) region in a normal mouse according to the experimental example shown in FIG. 1, the digging frequency and the digging time increased (blue rectangles: 10 Hz, 5 ms pulse width), suggesting that autism symptoms occurred.
Figure 3:
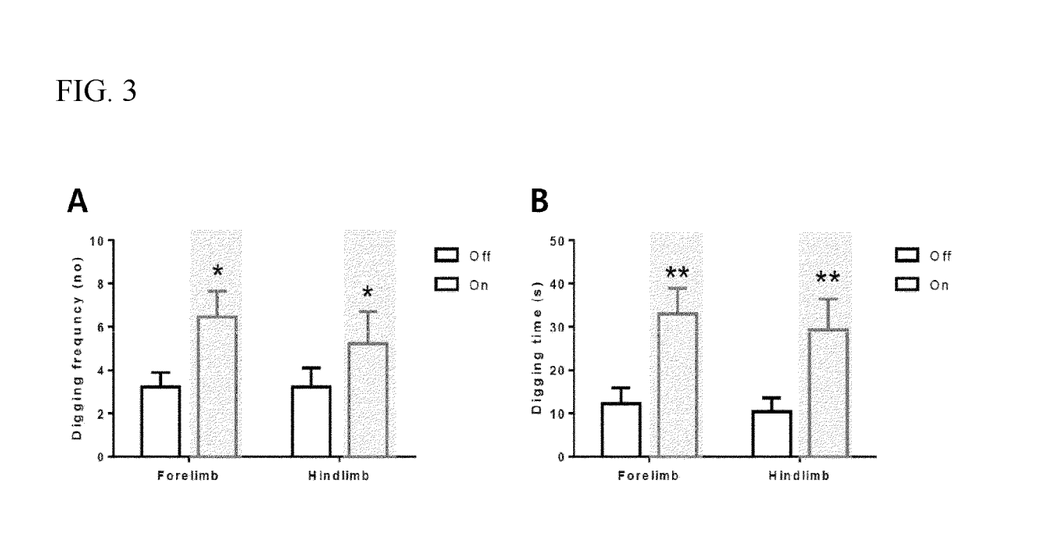
FIG. 3 depicts graphs showing that, when light was transmitted to the laterodorsal thalamus (LD) region in a normal mouse according to the experimental example shown in FIG. 1, the digging frequency and the digging time increased (blue rectangles: 10 Hz, 5 ms pulse width), suggesting that autism symptoms occurred.

In one specific example of the present invention, the present inventors confirmed that, when the thalamus of a normal mouse without autism was infected with an adeno-associated virus (AAV) vector containing the channelrhodopsin-2 (hChR2) gene and blue light was irradiated to neurons of the striatum, the digging frequency and the digging time significantly increased (see FIGS. 1 to 3).

Figure 4:
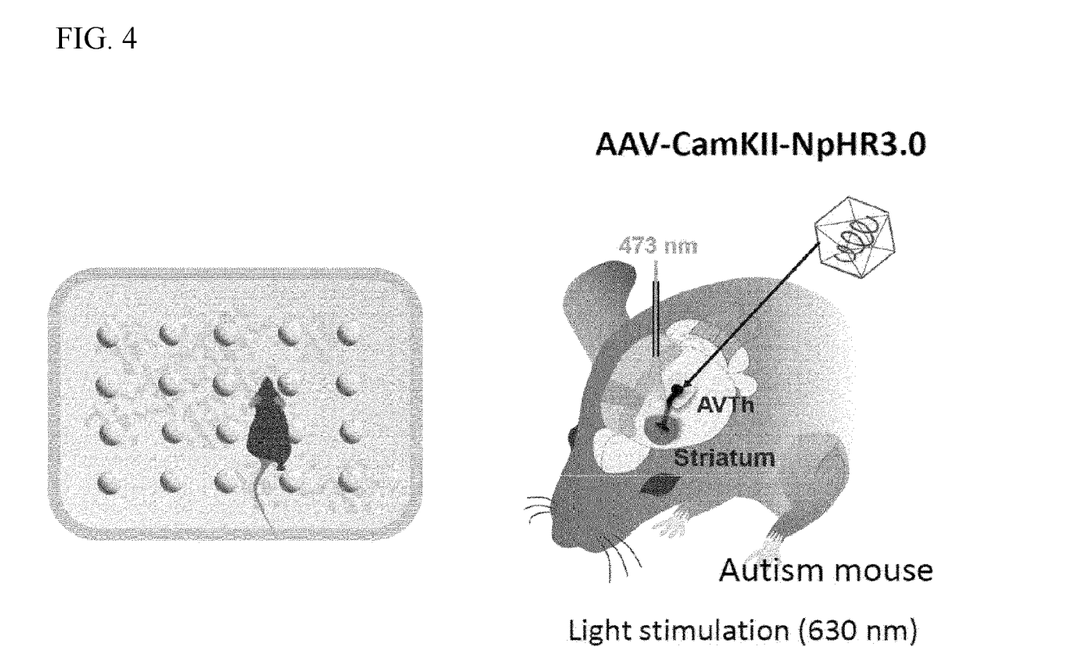
FIG. 4 is a schematic view explaining an experimental example for photostimulation of the ventrolateral thalamus (VL)-striatum synapses in a normal mouse according to another example of the present invention. The left side of FIG. 4 shows a repetitive behavior verification experiment for overcoming autism symptoms, and the right side of FIG. 4 shows the results of expressing halorhodopsin in the VAL (or AV) region and then irradiating red light at 630 nm to the striatum region.
Figure 5:
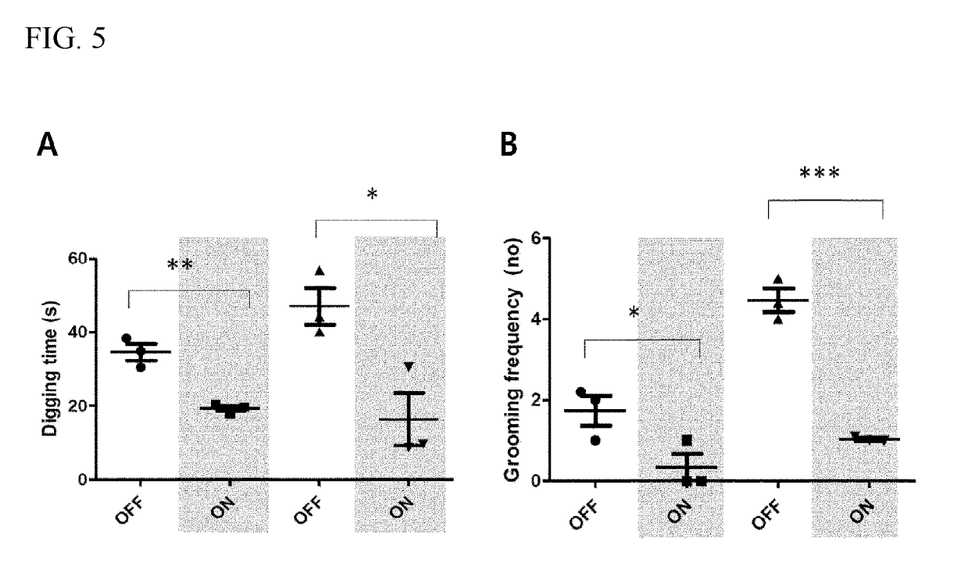
FIG. 5 depicts graphs showing that, when light was transmitted to the VAL (or VL) region in an autism mouse according to the experimental example shown in FIG. 4, the digging frequency and the digging time decreased (Red rectangles: continuous light), suggesting that autism symptoms were alleviated.

In another specific example of the present invention, the present inventors confirmed that, when the thalamus of a mouse with autism was infected with an adeno-associated virus (AAV) vector containing the halorhodopsin gene and red light was irradiated to neurons of the striatum, the digging frequency and the digging time significantly decreased (see FIGS. 4 and 5).

Thus, when the halorhodopsin protein, the polynucleotide encoding the halorhodopsin protein, or the vector comprising the polynucleotide is administered to neurons of the ventrolateral thalamus (VL), laterodorsal thalamus (LD) or striatum of a subject with autism spectrum disorder and then the halorhodopsin is expressed by light irradiation, the output signal of a population of neurons in the ventrolateral thalamus (VL), the laterodorsal thalamus (LD) or the striatum may be suppressed, thereby treating or preventing autism spectrum disorder.

As used herein, the term "autism spectrum disorder (ASD)" is meant to include at least one selected from the group consisting of autism, autistic disorder, pervasive developmental disorder (PDD), social interaction deficits, communication deficits, repetitive stereotyped behaviors, Rett's disorder, childhood disintegrative disorder, Asperger's syndrome, obsession disorder, obsessive compulsive disorder, and Pervasive Developmental Disorder Not Otherwise Specified (PDD-NOS).

The halorhodopsin protein of the present invention, the polynucleotide encoding the halorhodopsin protein, or the vector or $Ca^{2+}$ channel blocker comprising the polynucleotide may be formulated with carriers, diluents, excipients, or a combination of two or more thereof, which are commonly used in biological preparations. A pharmaceutically acceptable carrier is not particularly limited as long as it is suitable for delivery of the active ingredient into a living body. For example, the pharmaceutically acceptable carrier may be at least one of the compounds described in Merck Index, $13^{th}$ ed., Merck & Co Inc., saline, sterile water, Ringer's solution, buffered saline, dextrose solution, maltodextrin solution, glycerol, ethanol, and a mixture of one or more of these components. Other conventional additives, such as antioxidants, buffers, and bacteriostatic agents, may be added as needed. In addition, a diluent, dispersant, surfactant, binder and lubricant may be additionally added to prepare injectable formulations such as aqueous solutions, suspensions or emulsions, pills, capsules, granules, or tablets. Furthermore, the active ingredient may be preferably formulated depending on each disease or component by an appropriate method known in the art or by a method disclosed in Remington's Pharmaceutical Science.

The formulation of the present invention may further contain one or more active ingredients exhibiting the same or similar functions, in addition to the halorhodopsin protein of the present invention, the polynucleotide encoding the halorhodopsin protein, or the vector or $Ca^{2+}$ channel blocker comprising the polynucleotide.

The halorhodopsin protein of the present invention, the polynucleotide encoding the halorhodopsin protein, or the vector or $Ca^{2+}$ channel blocker comprising the polynucleotide may be administered orally or parenterally, and examples of parenteral administration include intracranial injection, intravenous injection, intramuscular injection, subcutaneous injection, intramuscular injection, intraperitoneal injection, and transdermal administration.

A suitable dosage of the halorhodopsin protein of the present invention, the polynucleotide encoding the halorhodopsin protein, or the vector or $Ca^{2+}$ channel blocker comprising the polynucleotide may be prescribed in various ways depending on factors such as formulation method, mode of administration, the patient's age, weight, sex, disease condition and diet, administration time, route of administration, in vivo absorption rate of the active ingredient, inactivation rate, drugs that are co-administered, excretion rate, and response sensitivity. Specifically, the daily dosage of the halorhodopsin protein of the present invention, the polynucleotide encoding the halorhodopsin protein, or the vector or $Ca^{2+}$ channel blocker comprising the polynucleotide is 0.0001 ng/kg (body weight) to 200 mg/kg (body weight).

The halorhodopsin protein of the present invention, the polynucleotide encoding the halorhodopsin protein, or the vector or $Ca^{2+}$ channel blocker comprising the polynucleotide may be prepared in a unit dosage form or contained in a multi-dose container by formulation using pharmaceutically acceptable carriers and/or excipients according to a method that may be easily carried out by those skilled in the art. A this time, the formulation may be a solution, suspension or emulsion in oil or aqueous medium, or an extract, powder, granule, tablet or capsule, and may further contain a dispersing agent or a stabilizer.

Another embodiment of the present invention is a mouse for monitoring autism spectrum disorder, in which halorhodopsin protein, a polynucleotide encoding the halorhodopsin protein, or a vector comprising the polynucleotide has been introduced and expressed in neurons of the ventrolateral thalamus (VL), laterodorsal thalamus (LD) or striatum of the mouse.

In one embodiment, the halorhodopsin protein may be expressed in neurons of the ventrolateral thalamus (VL), the laterodorsal thalamus (LD) or the striatum, and the expressed halorhodopsin protein may suppress the output signal of neurons of the ventrolateral thalamus (VL), the laterodorsal thalamus (LD) or the striatum by irradiation with light in a red wavelength region.

The mouse for monitoring autism spectrum disorder according to the present invention may be effectively used in a method for screening a candidate for preventing or treating autism spectrum disorder.

Another embodiment of the present invention is a method for screening a candidate for preventing or treating autism spectrum disorder, the method comprising steps of: injecting the candidate for preventing or treating autism spectrum disorder into the mouse for monitoring autism spectrum disorder; irradiating light in a red wavelength region to the mouse injected with the candidate; and comparing the behavior of the light-irradiated mouse with that of a control group.

In addition, the candidate may be, but is not limited to, one selected from the group consisting of natural compounds, synthetic compounds, RNA, DNA, polypeptides, enzymes, proteins, ligands, antibodies, antigens, bacterial or fungal metabolites, and bioactive molecules.

In addition, the method of injecting the candidate substance may be performed, for example, by administering the candidate to the mouse orally or by injection.

In addition, the method of comparing the behavior of the light-irradiated mouse with the control group may be performed, for example, by calculating and comparing the frequency or time of the digging behavior of the mouse injected with the candidate with the frequency or time of the digging behavior of a mouse not injected with the candidate. For example, if the frequency or time of the digging behavior of the mouse injected with the candidate is less than the frequency or time of the digging behavior of the mouse not injected with the candidate, the candidate may be selected as useful for autism.

Hereinafter, the present invention will be described in detail with reference to the following examples.

However, the following examples serve merely to illustrate the present invention, and the scope of the present invention is not limited by the following examples.

Terms and abbreviations used herein have the following meanings. If abbreviations are not defined, they may be interpreted as having the same meanings commonly understood by those skilled in the art to which the present invention pertains.

AAV: adeno-associated virus
ASD: autism spectrum disorder
hChR2: channelrhodopsin-2
VL: ventrolateral thalamus
LD: laterodorsal thalamus
WT: wild type
VAL: ventral anterolateral thalamus
AV: anteroventral thalamus
AVTh: anteroventral thalamic

EXAMPLES

<Example 1> Generation of WT Mice in which Channelrhodopsin (hChR2) has been Expressed WT mice (C57BL/6J) over 5 weeks old were used. Animal care and handling was performed according to the guidelines of the Animal Care and Use Committee of the Korea Institute of Science and Technology (KIST, Korea). Next, neurons of the ventrolateral thalamus (VL) or laterodorsal thalamus (LD) of each mouse were infected with an adeno-associated virus (AAV) vector carrying the channelrhodopsin-2 (hChR2) gene under the control of the CamKII promoter (FIG. 1).

The hChR2 are involved in light-activated cation channels. For use as the AAV vector, AAV-CamKII-Cre virus and AAV2/1-EF1α-DIO-hChR2 (H134R)-mCherry-WPRE (titer: 5.36×1012 gc/ml; Vector Core Facility at the University of Pennsylvania, USA) were mixed at a ratio of 1:1. For virus injection, all mice were anesthetized with avertin (20 mg/ml of tribromoethanol, 20 μl/g i.p.) and placed in a stereotaxic apparatus (David Kopf Instruments, USA). All the virus injections were delivered at a rate of 0.1 ml/min. 1.0 ml of the virus mixture was injected into the ventrolateral thalamus (VL; 1.0 mm anteroposterior [AP]; 1.0 mm mediolateral [ML]; 3.4 mm dorsoventral [DV]) or the laterodorsal thalamus (LD; 1.22 mm anteroposterior [AP]; 1.25 mm mediolateral [ML]; 2.6 mm dorsoventral [DV]). For the expression of opsins in VL or LD, the virus prepared in the same titer was used in different volumes of 0.6 microliters and 0.5 microliters, respectively, according to the size of target area.

After the virus mixture was injected, a fiberoptic probe with an external metal ferrule (200 mm diameter, 0.39 NA; Doric Lenses Inc., Canada) was implanted into the striatum and fixed to the skull using Super-Bond (Sun Medical Co., Japan).

<Example 2> Generation of ASD Mouse

As the autism spectrum disorder (ASD) mouse of the present invention, the autism animal model CNTNAP2 generated according to the method described in Poliak S. et al, 2003 was used. The present inventors used the CNTNAP2 ASD mouse generated by mating heterozygote mice.

<Example 3> Generation of ASD Mouse in which Halorhodopsin (NpHR3.0) has been Expressed Virus expressing the light-dependent chloride pump halorhodopsin (NpHR3.0) was injected into the VL of the CNTNAP2 ASD mouse generated in Example 2, thereby generating an ASD mouse in which halorhodopsin has been expressed. The VL region of the ASD mouse according to Example 2 of the present invention was infected with adeno-associated virus (AAV) carrying the NpHR3.0 gene under the control of the CamKII promoter.

The virus used to inject the halorhodopsin was AAV-CamKII-CRE, AAV-DIO-NpHR3.0-EYFP (Vector Core Facility at the University of Pennsylvania, USA). For virus injection, all mice were anesthetized with avertin and placed in a stereotaxic apparatus (David Kopf Instruments, USA). All the virus injections were delivered at a rate of 0.1 ml/min. For expression of opsins in a limited target area, a total of 1.8 ml of the virus mixture was injected into the VL. The coordinates of the VL thalamus were 1.0 mm AP, 1.1 ML, 3.4 DV.

After the virus mixture was injected, a fiberoptic probe with an external metal ferrule (200 mm diameter, 0.39 NA; Doric Lenses Inc., Canada) was implanted into the striatum and fixed to the skull using Super-Bond (Sun Medical Co., Japan).

EXPERIMENTAL EXAMPLES

<Experimental Example 1> Confirmation of Induction of Autism Animal Model from WT Mice Through Stimulation of Striatum with Blue Light Light stimulation was used to confirm that the autism animal model was induced from the channelrhodopsin-expressing WT mice according to Example 1 of the present invention.

The axons of neurons of each of the VL and the LD were photostimulated by irradiating blue light at 473 nm to the core region of the striatum of the channelrhodopsin-expressing mouse. For optogenetic stimulation experiments, 473 nm light was provided by a diode-pumped solid-state laser (CrystaLaser, USA) controlled by a pulse generator (Agilent, USA). After stimulation with blue light, the digging frequency and the digging time for the mouse were calculated, and the results are shown in FIGS. 2 and 3.

As shown in FIG. 2, it was confirmed that, when the light was transmitted to the ventrolateral thalamus (VL) region in the channelrhodopsin-expressing mouse according to Experimental Example 1 shown in FIG. 1, the digging frequency and the digging time of both the forelimb and the hind limb of the mouse significantly increased.

In addition, as shown in FIG. 3, it was confirmed that, when the light was transmitted to the laterodorsal thalamus (LD) region of the channelrhodopsin-expressing mouse according to Experimental Example 1 shown in FIG. 1, the digging frequency and the digging time of both the forelimb and the hind limb of the mouse significantly increased.

From the above results, it was confirmed through blue light irradiation that autism symptoms were induced in the WT mice to which the channelrhodopsin that enhances or activates the signal moving from the AV to the striatum was applied.

<Experimental Example 2> Confirmation of Alleviation of Autism Symptoms Through Stimulation of Striatum with Red Light In this Experimental Example, red light (630 nm) was irradiated to the striatum region of the halorhodopsin (NpHR3.0)-expressing mouse generated in Example 3, in order to confirm that VL and LD inputs were photoinhibited and autism symptoms were alleviated. The effect of the halorhodopsin was determined by calculating the digging frequency and the digging time for the mouse (FIG. 4).

The axons of neurons of the VL and the LD were photostimulated by irradiating red light at 473 nm to the core region of the striatum of the channelrhodopsin-expressing ASD mouse. For optogenetic stimulation experiments, 630 nm light was provided by a diode-pumped solid-state laser (CrystaLaser, USA) controlled by a pulse generator (Agilent, USA). After stimulation with red light, the digging frequency and the digging time for the mouse were calculated, and the results are shown in FIG. 5.

As shown in FIG. 5, it was confirmed that, when the light was transmitted to the VAL (or AV) region in the autism mouse according to the Experimental Example shown in FIG. 4, the digging frequency and the digging time of both the forelimb and the hind limb of the mouse significantly decreased.

From the above results, it was confirmed through red light irradiation that autism symptoms were effectively alleviated in the ASD mice to which the halorhodopsin that blocks the signal moving from the AV to the striatum was applied.

Although the present invention has been illustrated and described in relation to specific preferred embodiments, it will be apparent to those skilled in the art that the present invention may be variously modified and changed without departing from the technical features or scope of the present invention as defined in the following claims.

The invention claimed is:

1. A method for treating autism spectrum disorder (ASD), the method comprising:
    administering a vector comprising the polynucleotide sequence as set forth in SEQ ID NO: 2 to selectively express in neurons in the laterodorsal thalamus (LD) of a subject with ASD; and
    irradiating with red light at 630 nm only to the striatum of the subject, wherein axons from the neurons in the LD expressing the halorhodopsin extend into the striatum and wherein due to the administering step and the irradiating step, a signal from the LD to the striatum is blocked while excluding the signal on other brain regions connected to the LD such that the ASD is treated.

2. A method for treating autism spectrum disorder (ASD), the method comprising:
    administering a halorhodopsin protein comprising the amino acid sequence as set forth in SEQ ID NO: 1 into neurons in the laterodorsal thalamus (LD) of a subject with ASD; and
    irradiating with red light at 630 nm only to the striatum of the subject, wherein axons from the neurons in the LD expressing the halorhodopsin extend into the striatum and wherein due to the administering step and the irradiating step, a signal from the LD to the striatum is blocked while excluding the signal on other brain regions connected to the LD such that the ASD is treated.

3. The method of claim 1, wherein the vector is any one selected from the group consisting of a linear DNA vector, a plasmid DNA vector, and a recombinant viral vector.

4. The method of claim 3, wherein the recombinant viral vector is any one selected from the group consisting of retrovirus, adenovirus, adeno-associated virus, and lentivirus.

5. The method of claim 1, wherein the autism spectrum disorder (ASD) is at least one disease selected from the group consisting of autistic disorder, pervasive developmental disorder (PDD), communication deficits, repetitive stereotyped behaviors, childhood disintegrative disorder, obsessive compulsive disorder, and Pervasive Developmental Disorder Not Otherwise Specified (PDD-NOS).

* * * * *

SEQUENCE LISTING

<160> NUMBER OF SEQ ID NOS: 2

<210> SEQ ID NO 1
<211> LENGTH: 291
<212> TYPE: PRT
<213> ORGANISM: Artificial Sequence
<220> FEATURE:
<223> OTHER INFORMATION: Synthetic polypeptide (Halorhodopsin)

<400> SEQUENCE: 1

```
Met Thr Glu Thr Leu Pro Pro Val Thr Glu Ser Ala Val Ala Leu Gln
1               5                   10                  15

Ala Glu Val Thr Gln Arg Glu Leu Phe Glu Phe Val Leu Asn Asp Pro
                20                  25                  30

Leu Leu Ala Ser Ser Leu Tyr Ile Asn Ile Ala Leu Ala Gly Leu Ser
            35                  40                  45

Ile Leu Leu Phe Val Phe Met Thr Arg Gly Leu Asp Asp Pro Arg Ala
    50                  55                  60

Lys Leu Ile Ala Val Ser Thr Ile Leu Val Pro Val Val Ser Ile Ala
65              70                  75                  80

Ser Tyr Thr Gly Leu Ala Ser Gly Leu Thr Ile Ser Val Leu Glu Met
                85                  90                  95

Pro Ala Gly His Phe Ala Glu Gly Ser Ser Val Met Leu Gly Gly Glu
                100                 105                 110

Glu Val Asp Gly Val Val Thr Met Trp Gly Arg Tyr Leu Thr Trp Ala
            115                 120                 125

Leu Ser Thr Pro Met Ile Leu Leu Ala Leu Gly Leu Leu Ala Gly Ser
    130                 135                 140

Asn Ala Thr Lys Leu Phe Thr Ala Ile Thr Phe Asp Ile Ala Met Cys
145                 150                 155                 160

Val Thr Gly Leu Ala Ala Ala Leu Thr Thr Ser Ser His Leu Met Arg
                165                 170                 175

Trp Phe Trp Tyr Ala Ile Ser Cys Ala Cys Phe Ile Val Val Leu Tyr
                180                 185                 190

Ile Leu Leu Val Glu Trp Ala Gln Asp Ala Lys Ala Ala Gly Thr Ala
            195                 200                 205

Asp Ile Phe Ser Thr Leu Lys Leu Leu Thr Val Val Met Trp Leu Gly
210                 215                 220

Tyr Pro Ile Val Trp Ala Leu Gly Val Glu Gly Val Ala Val Leu Pro
225                 230                 235                 240

Val Gly Tyr Thr Ser Trp Ala Tyr Ser Ala Leu Asp Ile Val Ala Lys
                245                 250                 255

Tyr Ile Phe Ala Phe Leu Leu Leu Asn Tyr Leu Thr Ser Asn Glu Gly
                260                 265                 270

Val Val Ser Gly Ser Ile Leu Asp Val Pro Ser Ala Ser Gly Ala Pro
                275                 280                 285

Ala Asp Asp
        290

<210> SEQ ID NO 2
<211> LENGTH: 7286
<212> TYPE: DNA
<213> ORGANISM: Artificial Sequence
<220> FEATURE:
<223> OTHER INFORMATION: Synthetic polynucleotide (Halorhodopsin)

<400> SEQUENCE: 2
cctgcaggca gctgcgcgct cgctcgctca ctgaggccgc ccgggcaaag cccgggcgtc    60
gggcgacctt tggtcgcccg gcctcagtga gcgagcgagc gcgcagagag ggagtggcca   120
actccatcac tagggggttcc tgcggccgca cgcgtaagct ttgcaaagat ggataaagtt   180
ttaaacagag aggaatcttt gcagctaatg gaccttctag gtcttgaaag gagtgggaat   240
tggctccggt gcccgtcagt gggcagagcg cacatcgccc acagtccccg agaagttggg   300 gggagggggtc ggcaattgaa ccggtgccta gagaaggtgg cgcggggtaa actgggaaag   360
```

```
tgatgtcgtg tactggctcc gccttttcc cgagggtggg ggagaaccgt atataagtgc      420
agtagtcgcc gtgaacgttc tttttcgcaa cgggtttgcc gccagaacac aggtaagtgc      480
cgtgtgtggt tcccgcgggc ctggcctctt tacgggttat ggcccttgcg tgccttgaat      540
tacttccact ggctgcagta cgtgattctt gatcccgagc ttcgggttgg aagtgggtgg      600
gagagttcga ggccttgcgc ttaaggagcc ccttcgcctc gtgcttgagt tgaggcctgg      660
cctgggcgct ggggccgccg cgtgcgaatc tggtggcacc ttcgcgcctg tctcgctgct      720
ttcgataagt ctctagccat ttaaaatttt tgatgacctg ctgcgacgct ttttttctgg      780
caagatagtc ttgtaaatgc gggccaagat ctgcacactg gtatttcggt ttttggggcc      840
gcgggcggcg acggggcccg tgcgtcccag cgcacatgtt cggcgaggcg gggcctgcga      900
gcgcggccac cgagaatcgg acgggggtag tctcaagctg gccggcctgc tctggtgcct      960
ggcctcgcgc cgccgtgtat cgccccgccc tgggcggcaa ggctggcccg gtcggcacca     1020
gttgcgtgag cggaaagatg gccgcttccc ggccctgctg cagggagctc aaaatggagg     1080
acgcggcgct cgggagagcg ggcgggtgag tcacccacac aaaggaaaag ggcctttccg     1140
tcctcagccg tcgcttcatg tgactccacg gagtaccggg cgccgtccag gcacctcgat     1200
tagttctcga gcttttggag tacgtcgtct ttaggttggg gggaggggtt ttatgcgatg     1260
gagtttcccc acactgagtg ggtggagact gaagttaggc cagcttggca cttgatgtaa     1320
ttctccttgg aatttgccct ttttgagttt ggatcttggt tcattctcaa gcctcagaca     1380
gtggttcaaa gttttttct tccatttcag gtgtcgtgag gtaccggatc tctctagagtc     1440 gactccggaa taacttcgta taggatactt tatacgaagt tatgcagaat ggtagctgga     1500
ttgtagctgc tattagcaat atgaaacctc ttaataactt cgtatagcat acattatacg     1560
aagttatggc gcgcctcatt cacctcgtt ctcgtagcag aacttgtaca gctcgtccat     1620
gccgagagtg atcccggcgg cggtcacgaa ctccagcagg accatgtgat cgcgcttctc     1680 gttgggtgtct ttgctcaggg cggactggta gctcaggtag tggttgtcgg gcagcagcac     1740
ggggccgtcg ccgatggggg tgttctgctg gtagtggtcg gcgagctgca cgctgccgtc     1800
ctcgatgttg tggcggatct tgaagttcac cttgatgccg ttcttctgct tgtcggccat     1860
gatatagacg ttgtggctgt tgtagttgta ctccagcttg tgccccagga tgttgccgtc     1920
ctccttgaag tcgatgccct tcagctcgat gcggttcacc agggtgtcgc cctcgaactt     1980
cacctcggcg cgggtcttgt agttgccgtc gtccttgaag aagatggtgc gctcctggac     2040
gtagccttcg ggcatggcgg acttgaagaa gtcgtgctgc ttcatgtggt cggggtagcg     2100
ggcgaagcac tgcaggccgt agccgaaggt ggtcacgagg gtgggccagg gcacgggcag     2160
cttgccggtg gtgcagatga acttcagggt cagcttgccg taggtggcat cgccctcgcc     2220
ctcgccggac acgctgaact gtgggccgtt tacgtcgccg tccagctcga ccaggatggg     2280
caccaccccg gtgaacagct cctcgccctt gctcaccacg ttgatgtcga tctggtccag     2340
ggggatgtac tcgccctcgc tggtgatcct gctcttggcg gccgcatcat cagccgggt      2400 cccagaagca gatggaacat ccaaaatgct gccggacacg acagattcgt ttgacgtcag     2460
atagttcagg agcaagaatg cgaaaatgta ctttgccacg atatccagga aagaatatcc     2520
ccagctcgtc accccaacgg gcaacaccgc gatacccctcg actccaagag cccacacaat     2580
tggatacccc agccacatca ctactgtcaa cagcttcagg gtattgaaca tgtcagcggt     2640
tcccgcggct ttggcgtcct gtgcccactc caccagcagg atatacaaga ccaccagaaa     2700
```

```
gcatgcacaa ctgatagcgt accagaacca tctcatgagg tgggaggagg tagtcagggc    2760
cgcggcaagg ccagtcacgc acatagcgat atcgaaagtg atagctgtga agagctttgt    2820
agcattgctt ccggccagga gacccagagc gaggagaatc atgggcgtgg aaagtgccca    2880
ggtgagatac cgtccccaca tggtgactac accatctacc tcttctcctc ccagcatcac    2940
tgagctgcct tctgcaaaat ggcccgctgg catttcaaga acggaaattg tcaggccgct    3000
cgccaatcca gtgtaggagg caatgctgac gacaggcaca aggatggttg acacagcaat    3060
aagttttgcc cgtggatcat cgagtcctcg ggtcataaaa acgaacagca gtatactcag    3120
tcctgcaagt gcgatgttga tatagagact gcttgcaagc aaagggtcgt tcagcacgaa    3180
ctcgaacaac tcccttttggg taacctcggc ttgaagggcc acggcactct cggtcacggg    3240
aggcagggtc tctgtcatgg tggcgctagc ataacttcgt ataaagtatc ctatacgaag    3300
ttatttgcct taacccagaa attatcactg ttattcttta gaatggtgca aagaataact    3360
tcgtataatg tatgctatac gaagttatga attcgatatc aagcttatcg ataatcaacc    3420
tctggattac aaaatttgtg aaagattgac tggtattctt aactatgttg ctccttttac    3480
gctatgtgga tacgctgctt taatgccttt gtatcatgct attgcttccc gtatggcttt    3540
cattttctcc tccttgtata atcctggtt gctgtctctt tatgaggagt tgtggcccgt    3600
tgtcaggcaa cgtggcgtgg tgtgcactgt gtttgctgac gcaaccccca ctggttgggg    3660
cattgccacc acctgtcagc tccttccgg gactttcgct ttcccctcc ctattgccac    3720 ggcggaactc atcgccgcct gccttgcccg ctgctggaca ggggctcggc tgttgggcac    3780
tgacaattcc gtggtgttgt cggggaaatc atcgtccttt ccttggctgc tcgcctatgt    3840
tgccacctgg attctgcgcg ggacgtcctt ctgctacgtc ccttcggccc tcaatccagc    3900
ggaccttcct tcccgcggcc tgctgccggc tctgcggcct cttccgcgtc ttcgccttcg    3960
ccctcagacg agtcggatct ccctttgggc cgcctccccg catcgatacc gagcgctgct    4020
cgagagatct acgggtggca tccctgtgac ccctccccag tgcctctcct ggccctggaa    4080
gttgccactc cagtgcccac cagccttgtc ctaataaaat taagttgcat cattttgtct    4140
gactaggtgt ccttctataa tattatgggg tggaggggggg tggtatggag caaggggcaa    4200
gttgggaaga caacctgtag ggcctgcggg gtctattggg aaccaagctg gagtgcagtg    4260
gcacaatctt ggctcactgc aatctccgcc tcctgggttc aagcgattct cctgcctcag    4320
cctcccgagt tgttgggatt ccaggcatgc atgaccaggc tcagctaatt tttgtttttt    4380
tggtagagac ggggtttcac catattggcc aggctggtct ccaactccta atctcaggtg    4440
atctacccac cttggcctcc caaattgctg ggattacagg cgtgaaccac tgctcccttc    4500
cctgtccttc tgattttgta ggtaaccacg tgcggaccga gcggccgcag gaacccctag    4560
tgatggagtt ggccactccc tctctgcgcg ctcgctcgct cactgaggcc gggcgaccaa    4620
aggtcgcccg acgcccgggc tttgcccggg cggcctcagt gagcgagcga gcgcgcagct    4680
gcctgcaggg gcgcctgatg cggtattttc tccttacgca tctgtgcggt atttcacacc    4740
gcatacgtca aagcaaccat agtacgcgcc ctgtagcggc gcattaagcg cggcgggtgt    4800
ggtggttacg cgcagcgtga ccgctacact tgccagcgcc ctagcgcccg ctcctttcgc    4860
tttcttccct tcctttctcg ccacgttcgc cggctttccc cgtcaagctc taaatcgggg    4920 gctccctta gggttccgat ttagtgcttt acggcacctc gaccccaaaa aacttgattt    4980
gggtgatggt tcacgtagtg ggccatcgcc ctgatagacg ttttcgcc ctttgacgtt    5040 ggagtccacg ttctttaata gtggactctt gttccaaact ggaacaacac tcaaccctat    5100
```

```
ctcgggctat tcttttgatt tataagggat tttgccgatt tcggcctatt ggttaaaaaa   5160
tgagctgatt taacaaaaat ttaacgcgaa ttttaacaaa atattaacgt ttacaatttt   5220
atggtgcact ctcagtacaa tctgctctga tgccgcatag ttaagccagc cccgacaccc   5280
gccaacaccc gctgacgcgc cctgacgggc ttgtctgctc ccggcatccg cttacagaca   5340
agctgtgacc gtctccggga gctgcatgtg tcagaggttt tcaccgtcat caccgaaacg   5400
cgcgagacga aagggcctcg tgatacgcct atttttatag gttaatgtca tgataataat   5460
ggtttcttag acgtcaggtg gcacttttcg gggaaatgtg cgcggaaccc ctatttgttt   5520
atttttctaa atacattcaa atatgtatcc gctcatgaga caataaccct gataaatgct   5580
tcaataatat tgaaaaagga agagtatgag tattcaacat ttccgtgtcg cccttattcc   5640
cttttttgcg gcattttgcc ttcctgtttt tgctcaccca gaaacgctgg tgaaagtaaa   5700
agatgctgaa gatcagttgg gtgcacgagt gggttacatc gaactggatc tcaacagcgg   5760
taagatcctt gagagttttc gccccgaaga acgttttcca atgatgagca cttttaaagt   5820
tctgctatgt ggcgcggtat tatcccgtat tgacgccggg caagagcaac tcggtcgccg   5880
catacactat tctcagaatg acttggttga gtactcacca gtcacagaaa agcatcttac   5940
ggatggcatg acagtaagag aattatgcag tgctgccata accatgagtg ataacactgc   6000
ggccaactta cttctgacaa cgatcggagg accgaaggag ctaaccgctt ttttgcacaa   6060
catgggggat catgtaactc gccttgatcg ttgggaaccg gagctgaatg aagccatacc   6120
aaacgacgag cgtgacacca cgatgcctgt agcaatggca acaacgttgc gcaaactatt   6180
aactggcgaa ctacttactc tagcttcccg gcaacaatta atagactgga tggaggcgga   6240
taaagttgca ggaccacttc tgcgctcggc ccttccggct ggctggttta ttgctgataa   6300
atctggagcc ggtgagcgtg ggtctcgcgg tatcattgca gcactggggc cagatggtaa   6360
gccctcccgt atcgtagtta tctacacgac ggggagtcag gcaactatgg atgaacgaaa   6420
tagacagatc gctgagatag gtgcctcact gattaagcat tggtaactgt cagaccaagt   6480
ttactcatat atactttaga ttgatttaaa acttcatttt taatttaaaa ggatctaggt   6540
gaagatcctt tttgataatc tcatgaccaa aatcccttaa cgtgagtttt cgttccactg   6600
agcgtcagac cccgtagaaa agatcaaagg atcttcttga gatccttttt ttctgcgcgt   6660
aatctgctgc ttgcaaacaa aaaaaccacc gctaccagcg gtggtttgtt tgccggatca   6720
agagctacca actctttttc cgaaggtaac tggcttcagc agagcgcaga taccaaatac   6780
tgtccttcta gtgtagccgt agttaggcca ccacttcaag aactctgtag caccgcctac   6840
atacctcgct ctgctaatcc tgttaccagt ggctgctgcc agtggcgata agtcgtgtct   6900
taccgggttg gactcaagac gatagttacc ggataaggcg cagcggtcgg gctgaacggg   6960
gggttcgtgc acacagccca gcttggagcg aacgacctac accgaactga gatacctaca   7020
gcgtgagcta tgagaaagcg ccacgcttcc cgaagggaga aaggcggaca ggtatccggt   7080
aagcggcagg gtcggaacag gagagcgcac gagggagctt ccagggggaa acgcctggta   7140
tctttatagt cctgtcgggt ttcgccacct ctgacttgag cgtcgatttt tgtgatgctc   7200 gtcaggggg cggagcctat ggaaaaacgc cagcaacgcg gccttttac ggttcctggc   7260 cttttgctgg ccttttgctc acatgt                                       7286
```